(12) United States Patent
Mason

(10) Patent No.: US 7,401,130 B2
(45) Date of Patent: Jul. 15, 2008

(54) CLICK FRAUD PREVENTION

(75) Inventor: Zachary Mason, Palo Alto, CA (US)

(73) Assignee: Efficient Frontier, Mountain View, CA (US)

( * ) Notice: Subject to any disclaimer, the term of this patent is extended or adjusted under 35 U.S.C. 154(b) by 0 days.

(21) Appl. No.: 11/499,307

(22) Filed: Aug. 3, 2006

(65) Prior Publication Data

US 2007/0033106 A1    Feb. 8, 2007

Related U.S. Application Data

(60) Provisional application No. 60/705,599, filed on Aug. 3, 2005.

(51) Int. Cl.
*G06F 13/00* (2006.01)

(52) U.S. Cl. ................ 709/219; 709/224; 709/227; 719/329; 705/25; 705/26

(58) Field of Classification Search ........... 709/219, 709/224, 227; 719/329; 705/25, 26
See application file for complete search history.

(56) References Cited

U.S. PATENT DOCUMENTS

| | | | |
|---|---|---|---|
| 6,401,075 B1 * | 6/2002 | Mason et al. ............ 705/14 |
| 6,434,614 B1 * | 8/2002 | Blumenau ............ 709/224 |
| 7,020,622 B1 * | 3/2006 | Messer ............ 705/26 |
| 2001/0037314 A1 * | 11/2001 | Ishikawa ............ 705/67 |
| 2004/0029566 A1 * | 2/2004 | Cunningham et al. ..... 455/412.1 |
| 2004/0153365 A1 * | 8/2004 | Schneider et al. ........... 705/14 |
| 2005/0144067 A1 * | 6/2005 | Farahat et al. ............ 705/14 |
| 2006/0004628 A1 * | 1/2006 | Axe et al. ............ 705/14 |
| 2006/0041517 A1 * | 2/2006 | Liao ............ 705/80 |
| 2006/0136294 A1 | 6/2006 | Linden et al. |
| 2006/0200555 A1 * | 9/2006 | Shannon et al. ............ 709/224 |
| 2006/0253425 A1 * | 11/2006 | Borgs et al. ............ 707/3 |
| 2007/0022005 A1 * | 1/2007 | Hanna ............ 705/14 |

* cited by examiner

*Primary Examiner*—Viet Vu
(74) *Attorney, Agent, or Firm*—Schwabe, Williamson & Wyatt, P.C.

(57) ABSTRACT

Methods, apparatuses, and articles of manufacture for detecting, by an agent trusted by a merchant and a search engine, a click on an advertisement displayed by the search engine, are described herein. The trusted agent may further determine that a transaction of the merchant associated with the displayed advertisement was completed and determine whether the completed transaction was resulted from the click. In some embodiments, the trusted agent may notify the merchant and the search engine of a billing event associated with the click, if the completed transaction was determined to be resulted from the click.

20 Claims, 3 Drawing Sheets

CLICK FRAUD PREVENTION

RELATED APPLICATIONS

The present application claims priority to U.S. Provisional Application 60/705,599, entitled "Click Fraud Prevention", filed on Aug. 3, 2005. The specifications of the 60/705,599 provisional application is hereby fully incorporated by reference.

FIELD

Embodiments of the present invention relate generally to the field of data processing. More specifically, the present invention relates to facilitating payments for the display of online advertising, having particular application to advertising with a search service, commonly referred to as a search engine.

BACKGROUND

Payment models for the display of online advertising with a search service, (hereinafter, a search engine) include pay-per-click, which obliges advertisers to pay search engines a fee each time a user clicks on an ad displayed on a search page or search result page or any widget or web content displaying advertisements. This type of payment model is susceptible to click fraud, which is constituted by clicks made with the intention of costing the search engine or the advertiser money without providing anything of value in return (i.e. clicks made with the intention of distorting the market). The distributed nature of the Internet and the relative anonymity of browsers make detecting click fraud difficult.

An alternative payment method which avoids the problem of click fraud provides that the search engine receive a fee for each user conversion. A conversion occurs each time a user engages in a transaction with a merchant after reaching the merchant's website by clicking on an online advertisement. A merchant may have many conversion types such as, but not limited to, purchases of goods, services, registrations, or subscriptions. A credit card or other type of transaction may serve as proof that an authentic conversion has occurred and thereby reduce the risk of fraud. However, one difficulty with the pay-for-conversion method may be that the interests of the advertiser/merchant and the search engine do not align.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS OF THE INVENTION

Illustrative embodiments of the present invention include but are not limited to methods and apparatuses for detecting, by an agent trusted by a merchant and a search engine, a click on an advertisement displayed by the search engine. The trusted agent may further determine that a transaction of the merchant associated with the displayed advertisement was completed and determine whether the completed transaction was resulted from the click. In some embodiments, the trusted agent may notify the merchant and the search engine of a billing event associated with the click, if the completed transaction was determined to have resulted from the click.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1A:
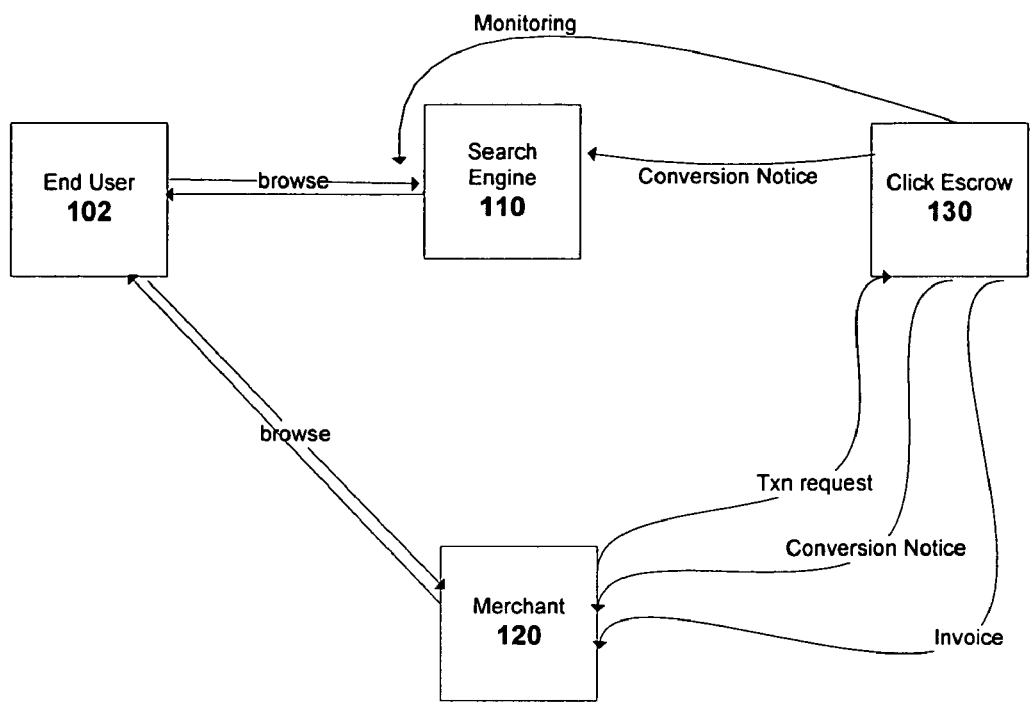
FIGS. 1a-1b illustrate an overview of the invention, in accordance with various embodiments.
Figure 1B:
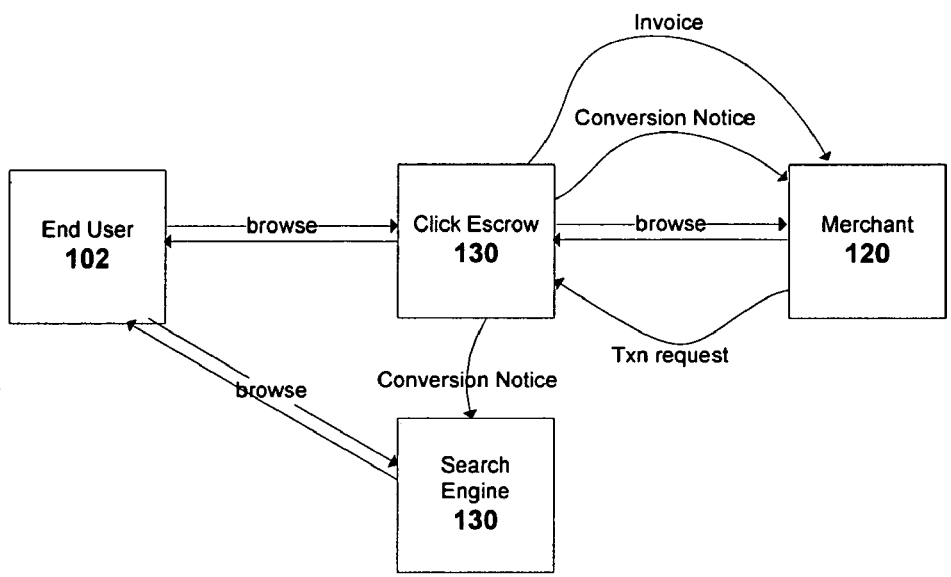

FIGS. 1a-1b illustrate an overview of the invention, in accordance with various embodiments. FIG. 1a illustrates an embodiment where an agent (also referred to as a click escrow) 130 trusted by a merchant 120 and a search engine 110 may monitor the search behavior of an end user using an end user device 102 without acting as a physical intermediary between the user device 102 and the merchant 120. In another embodiment, FIG. 1b illustrates the trusted agent 130 (hereinafter, click escrow 130) acting as a physical intermediary between an end user device 102 and the merchant 120. In various embodiments, the third party click escrow 130 may mediate the interaction between the search engine 110 and its advertisers (merchants 120). The click escrow 130 may be trusted by both the advertisers/merchants 120 and the search engine 110 to fairly represent their respective interests. The click escrow 130 may fairly represent both interests by verifying that a conversion has taken place (thereby securing the advertiser/merchant 120's interests) and by verifying that a billable event has taken place (thereby securing the search engine 110's interest). The click escrow 130 may verify that a transaction has taken place by, for example, receiving a transaction verification from merchant 120 and examining credit card records, or processing the credit card transaction itself. In some embodiments, all conversions are billable events, while in other embodiments, some conversions (based on e.g. application dependent criteria) may be considered non-billable events.

As illustrated in both FIGS. 1a-1b, an end user device 102 may connect to a search engine 110, in some embodiments across a networking fabric (not shown). While browsing on the search engine 110, the end user device 102 may receive a search page or a search results page that includes an advertisement linking to a website of merchant 120. In some embodiments, illustrated by FIG. 1a, the click escrow 130 may monitor the search behavior of the end user using end user device 102, including a click by the end user on the merchant 120's advertisement, the click resulting in a connection between the end user device 102 and the merchant 120's website. In these embodiments, click escrow 130 may be notified of the actions of the end user, e.g. via java code embedded in the web-page being viewed from the end user device 102. In other embodiments, illustrated by FIG. 1b, the click escrow 130 may serve as a physical intermediary between the end user device 102 and the merchant 120. In such other embodiments, when an end user clicks on the advertisement, the end user device 102 may be re-directed to the click escrow 130, which may establish a connection between the end user device 102 and the merchant 120. The click escrow 130's role as intermediary may or may not be hidden from the end user and end user device 102. In both FIGS. 1a and 1b, once a connection is established between the end user device 102 and the merchant 120, if the end user using end user device 102 attempts a transaction, the merchant 120 may either process the transaction itself and notify the click escrow 130, or may send a transaction request to the click escrow 130 requesting the click escrow 130 to process the transaction. Upon determining that a completed, successful conversion has occurred, the click escrow 130 may notify the merchant 120 and the search engine 110 of the billing event/conversion, and may provide the merchant 120 with an invoice. In some embodiments, rather than notifying the search engine 110 and merchant 120 each time a conversion occurs, click escrow 130 may send the notifications in batches.

In various embodiments, each of the end user devices 102 (referring to the device of the end user), search engine 110, merchant 120, and click escrow 130 may be implemented as a separate computing device. In other embodiments, one or more of end user device 102, search engine 110, merchant 120, and click escrow 130 may be implemented on the same computing device. The various computing devices having one or more of the above components may be any sort of computing device known in the art, except for modules performing the operations of one or more of end user device 102, search engine 110, merchant 120, and click escrow 130, including, but not limited to, PCs, workstations, servers, routers, mainframes, PDAs, set-top boxes, and mobile phones. The various computing devices may be connected by one or more networking fabrics (not shown). The one or more networking fabrics may be any sort of network(s) known in the art, such as local area networks (LAN), wide area networks (WAN), which may be public or private, or the Internet. The one or more networking fabrics may further utilize any sort of connections known in the art, such as Transmission Control Protocol/Internet Protocol (TCP/IP) connections, or Asynchronous Transfer Mode (ATM) virtual connections. In one embodiment, the end user device 102 may connect to both of the search engine 110 and the merchant 120 through a public WAN or the Internet, and the click escrow 130 may connect to one or both of search engine 110 and merchant 120 through a private WAN or LAN.

As is shown, end user device 102 may be capable of connecting to and browsing a search engine 110 and a merchant 120, with a click escrow 130, in some embodiments, acting as a physical intermediary between the end user device 102 and the merchant 120. As is described above, the end user device 102 may comprise a computing device that may be remote from the search engine 110, merchant 120, and click escrow 130, and connectable to those components through a networking fabric. To facilitate the browsing of the search engine 110 and the merchant 120, end user device 102 may further comprise a browser. The browser may be any sort of application known in the art capable of displaying content from a remote device and facilitating a user in interacting with the content, such as the Internet Explorer browser of the Microsoft Corporation or the Firefox browser of the Mozilla Foundation. In other embodiments, the browser may be an application-specific browser designed specifically to enable the end user device 102 to interact with the search engine 110, the merchant 120, and/or the click escrow 130.

In some embodiments, upon connecting to search engine 110, through the hypertext transfer protocol (http) or some other communication protocol, end user device 102 may receive a search page with a field that may accept search terms or phrase. The end user device 102 may provide the search term or phrase through the browser, and may submit the search term or phrase to search engine 110. Search engine 110 may then in return provide the end user device 102 with a search results page viewable through the browser. The search results page may comprise one or more advertisements that the search engine 110 has determined are relevant to the search term or phrase. The end user device 102 may then click on one of the advertisements, through the browser. The advertisement may include a link to the website of a merchant 120, and clicking on the advertisement may result in a connection with the merchant 120 website. In alternate embodiments, depicted by FIG. 1b, clicking on the advertisement may first result in the end user 102 establishing a connection with the click escrow 130, which may act as a physical intermediary between the end user device 102 and the merchant 120. The click escrow 130 may then establish a connection to the merchant 120 website on behalf of the end user device 102. The role of the click escrow 130 as a physical intermediary may or may not be hidden from the end user device 102. Upon connecting to the merchant 120 website, the end user device 102 may receive web content from the merchant 120, including product information, order forms, and offers for subscription or registration, the web content proposing and/or permitting a transaction to the end user device 102. If the end user device 102 is interested in entering into a transaction with the merchant 120, the end user device 102 may provide personal information, such as name and address and credit card or other payment information. In some embodiments, the end user device 102 may provide additional information to secure the transaction, such as a password or a biometric.

In various embodiments, the search engine or search engine service 110 (i.e. the computing device or devices implementing the engine/service) may be adapted to provide a search request page to end users, such as end user device 102, to receive search terms or phrase from end users using end user device 102, to perform searches based on the terms or phrases, to provide end users using end user device 102 with a search results page listing links to merchants 120, including advertisements, to accept end user clicks on the links, and to await notification of conversions correlated to the end user device 102 clicks. As is described above, the search engine 110 may comprise a computing device that may be remote from one or more of the end user device 102, merchant 120, and click escrow 130, and connectable to those components through a networking fabric. In some embodiments, search engine 110 may comprise an application server.

As illustrated, the search engine 110 may service end user device 102 search requests, including search requests based on one or more search terms or phrases. The search engine may first provide the end user device 102 with a search input page comprising an input field where end user using end user device 102 may input a search term or phrase. Upon receiving the search term or phrase, the search engine 110 may then perform a search and may determine a plurality of relevant search results, which may be shown to the user along with a set of advertisements that may be relevant to the search term, possibly including that of the merchant 120. The set of advertisements may be determined by the click escrow 130 instead of the search engine 110 (probably in some way transparent to the user). In some embodiments, a comprehensive optimization of a portfolio of ad search keywords may be provided, using factors including, but not limited to, click-through, conversion rates, and click fraud, for use in determining one or more of the search results. Upon determining the search results, including the advertisement(s), the search engine 110 may provide the end user device 102 with a search results page including the advertisement(s) and other results for display on the end user device 102 browser. In some embodiments, the search engine 110 may then await a user click on one of the advertisements and may establish a connection between the end user device 102 and the merchant 120 to which to the advertisement belongs. In other embodiments, illustrated by FIG. 1b, upon receiving the end user device 102 click, the search engine 110 may instead establish a connection between the end user device 102 and the click escrow 130 and provide the click escrow 130 with the merchant 120's uniform resource locator (url) address to facilitate the click escrow 130 in establishing a connection between the end user device 102 and the merchant 120. In one embodiment, the click escrow 130 may be responsible for displaying merchant advertisements. The search engine 110 may simply do the search, and not control what advertisements appear on its site. In yet other embodiments, also illustrated by FIG. 1b, the search engine 110 may embed a program, cookie, or the like in the url associated with the advertisement before providing the search results to the end user device 102. When the end user using end user device 102 clicks on the advertisement, the embedded code may establish a connection between the end user device 102 and the click escrow 130. For each ad it provides for display, search engine 110 may await a possible notification of a conversion event from the click escrow 130. As discussed below, such an event may occur if the user 102 clicks on the ad, gets taken to the merchant 120's website, and enters into a successful transaction with the merchant 120.

In some embodiments of the invention, not shown search engine 110 may further order the display of ads for a given keyword using factors including, but not limited to, the probability of end user click through on an ad, the probability of a conversion for merchant 120, the payoff the search engine 110 receives in the event of a conversion. In alternate embodiments, search engine 110 may delegate the display order of the ads to click escrow 130. In other embodiments, click arbitrage may be additionally practiced. That is, clicks from multiple search engines may be sold to merchant 120 in a way opaque to end user using end user device 102 and/or merchant 120.

As is illustrated in FIGS. 1a-1b, a merchant or service 120 (i.e. the computing devices implementing the merchant/service) may be connected to an end user device 102, either directly, as shown in FIG. 1a, or indirectly through click escrow 130, as is shown in FIG. 1b. The merchant 120 may propose a transaction to the end user 102, may receive indicia of the end user 102's intent to enter into a transaction, may request that the click escrow 130 process the transaction, and may await both confirmation of the success or failure of the transaction, and, if successful and correlated to a click by an end user using end user device 102 on an advertisement of merchant 120, an invoice for the conversion. In correlating user clicks to conversions, factors such as the time between the click and the conversion may or may not be relevant. As is described above, the merchant 120 may comprise a computing device that may be remote from one or more of the end user device 102, search engine 110, and click escrow 130, and connectable to those components through a networking fabric. In some embodiments, merchant 120 may comprise an application server.

In some embodiments, a merchant 120 may service end user device 102 requests. An end user device 102 may link to the merchant 120's web page, in the manner described above, and may make a number of http requests through its client browser. In some embodiments, the merchant 120 may service the http requests and transmit web pages which may include product information, order forms, and offers for subscription or registration. In alternate embodiments, communication protocols other than or in addition to http may be employed. Upon receiving the content provided by the merchant 120, which may include a web page that enables the end user 102 to enter into a transaction with the merchant 120, the end user using end user device 102 may attempt to enter into a transaction with the merchant 120. In some embodiments, merchant 120 may then receive an indication of the end user using end user device 102's intent to enter into a transaction, such as personal information about the user and credit card or other payment information. The merchant 120 may next send a transaction request to click escrow 130. The transaction request provided to the click escrow 130 may, in some embodiments, include the credit card information. The click escrow 130 may then process the transaction, which may include interacting with a remote credit card server. The processes of the click escrow 130 are described in greater detail below. In some embodiments, subsequent to processing the transaction, the click escrow 130 may provide the merchant 120 with a notification that the transaction has, or has not, been successfully processed. If the transaction has successfully processed, the merchant 120 may then await the arrival of a conversion invoice for any qualifying transactions. The click escrow 130 may provide such an invoice to merchant 120 in real time or in batches of invoices, if the click escrow 130 determines that the conversion has resulted from an end user click.

In other embodiments, not shown, the click escrow 130 may verify the credit card transactions rather than process them. In such embodiments, the merchant 120 may process the transaction itself, including connecting to and communicating with a credit card server to verify a successful charge event, and may provide the verification to the click escrow 130. The click escrow 130 may then provide and invoice to merchant 120, if the transaction resulted from an end user click on an advertisement displayed by search engine 110. In yet other embodiments, also not shown, the transaction may be accomplished by means other than credit card transactions, with the click escrow 130 either processing or verifying the transactions.

In some embodiments, click arbitrage may be additionally practiced. That is, clicks from multiple search engines may be sold to merchant 120 in a way opaque to end user device 102 and/or merchant 120. Click arbitrage may also include deriving high cost keywords from low cost keywords. For example, a user may search for "buy a house in the Midwest." Advertisements associated with that keyword may be relatively low cost. In return, the click escrow 130 may display "mortgage" advertisements to the user, the "mortgage" advertisements having a higher cost. If the user clicks on the "mortgage" advertisement, the click escrow 130 may be entitled to the difference between the advertisement costs. In other embodiments of the invention, click escrow 130 may use methods in addition to, or instead of, credit card transactions to identify user identity (and thus, indirectly facilitate identifying fraud) including, but not limited to, passwords, biometrics, and Turing tests, the passwords and biometrics provided to merchant 120 by the end user using end user device 102. In yet other embodiments, security measurements are provided to ensure merchant 120 dutifully forwards all credit card transactions to click escrow 130 for examination.

As is shown in FIGS. 1a-1b, the click escrow 130 (or more specifically, the computing devices implementing the escrow service) may process transactions on behalf of a merchant 120 and, for successful transactions, may notify the merchant 120 of the success of the transaction and determine whether the transaction resulted from a user click. If the transaction resulted from a user click, the click escrow 130 may notify the search engine 110 and the merchant 120 of the billing event and provide merchant 120 with an invoice. In the embodiments illustrated by FIG. 1a, click escrow 130 may monitor the search behavior of the end user using end user device 102 browsing the search engine and may detect and store user clicks. In the alternate embodiments illustrated by FIG. 1b, click escrow 130 may act as a physical intermediary between the end user device 102 and the merchant 120, establishing a connection to merchant 120 on behalf of end user device 102. As is described above, the click escrow 130 may comprise a computing device that may be remote from one or more of the end user device 102, search engine 110, and merchant 120, and connectable to those components through a networking fabric. In some embodiments, click escrow 130 may be implemented on the same computer system(s) as one or both of search engine 110 and merchant 120.

In various embodiments, such as those illustrated by FIG. 1a, the click escrow 130 may monitor the search behavior of the end user using end user device 102 on search engine 110, including detecting clicks by the end user using end user device 102 on advertisements displayed among the search results. The advertisement clicked on by an end user using end user device 102 may be an advertisement of merchant 120. Click escrow 130 not only detects such clicks, but may store them as well for future reference. Upon detecting the click, the click escrow 130 may await a transaction request from the merchant 120. Such transaction requests are described in greater detail above, and may include, for example, requests for credit transactions. After receiving a transaction request, the click escrow 130 may then process the transaction, and may then determine whether the transaction processed successfully. If the transaction request is for a credit card transaction, the click escrow 130 may communicate with a remote credit card server to complete the transaction, providing the credit card information and receiving return notification of whether a successful charge occurred. If the transaction was successful, click escrow 130 may notify the merchant 120 of the successful billing event. The notification may take the form of a function call, web content, an email, etc. The click escrow 130 may also notify the merchant if the transaction was not successfully completed. In some embodiments, the click escrow 130 may then attempt to match an end user advertisement click, which, as mentioned above, may have been stored by click escrow 130, to the successful transaction to determine whether a conversion has occurred. For example, click escrow 130 may store an entry for each advertisement of each merchant 120 (i.e., in a database or file), and may keep a counter of each click associated with that advertisement. If a transaction resulting from a merchant 120 web page that is linked from the advertisement is successful, the click escrow 130 may note the occurrence of a conversion based on the advertisement and decrement the above described counter. Upon determining that a conversion has occurred, click escrow 130 may then notify the search engine 110 of the conversion, and issue a conversion invoice to the merchant 120 in real time or in batch. The notification/invoice may take the form of a function call, web content, an email, etc.

In other embodiments of the invention, not shown, click escrow 130 may verify the credit card transactions rather than process them. In such embodiments, the click escrow 130 may receive the verification from merchant 120 and determine if the verified transaction resulted from an advertisement click, in the manner described above. In various embodiments, the transaction may be accomplished by means other than credit card transactions, with the click escrow 130 either processing or verifying the transactions.

In yet other embodiments, illustrated by FIG. 1b, the click escrow 130 may act as a physical intermediary between the merchant 120 and the end user device 102. The search engine 110, upon receiving a click on an advertisement, may connect the end user device 102 to the click escrow 130 rather than to the merchant 120 which the ad links to. The click escrow 130 may then establish a connection between the end user device 102 and merchant 120. The click escrow 130's role as a physical intermediary may or may not be hidden from the end user device 102. Also, the search engine 110 may even delegate the display order of the ads to click escrow 130.

In some embodiments of the invention, click escrow 130 may use methods in addition to, or instead of, credit card transactions to identify fraud including, but not limited to, passwords, biometrics, and Turing tests. Further, in various embodiments, security measurements are provided to ensure merchant 120 dutifully forward all credit card transactions to click escrow 130 for examination.

In yet other embodiments, click escrow 130 may provide merchants, such as merchant 120 with a plurality of keyword services. For example, click escrow 130 might receive one or more keywords from merchant 120 for which merchant 120 would like to receive predictions of keyword effectiveness, such as predictions of click-through and conversion rates. Click escrow 130 may determine the predictions based on metrics it has stored from previous conversions and from observed end user search behavior. In one embodiment, the determining may utilize a keyword effectiveness prediction method such as the method taught by U.S. patent application Ser. No. 11/370,679, "KEYWORD EFFECTIVENESS PREDICTION METHOD AND APPARATUS," which was filed on Mar. 8, 2006. The specification of the Ser. No. 11/370,679 application is hereby fully incorporated by reference. In other embodiments, the keyword services offered by click escrow 130 may include keyword generation services. Click escrow 130 may receive a plurality of keyword criteria from merchant 120, and based on those criteria (such as conversion and click through rates for a given subject matter) may provide merchant 120 with one or more keywords that may be used to advertise on search engine 110. Click escrow 130 may determine the keywords based on metrics it has stored from previous conversions and from observed end user search behavior. In one embodiment, the determining may utilize a keyword generation method such as the method taught by U.S. patent application Ser. No. 11/371,267, "KEYWORD GENERATION METHOD AND APPARATUS," which was filed on Mar. 8, 2006. The specification of the Ser. No. 11/371,267 application is also hereby fully incorporated by reference. In still other embodiments, all or part of these keyword services may be offered by a separate service independent of or in coordination with click escrow 130.

Figure 2:
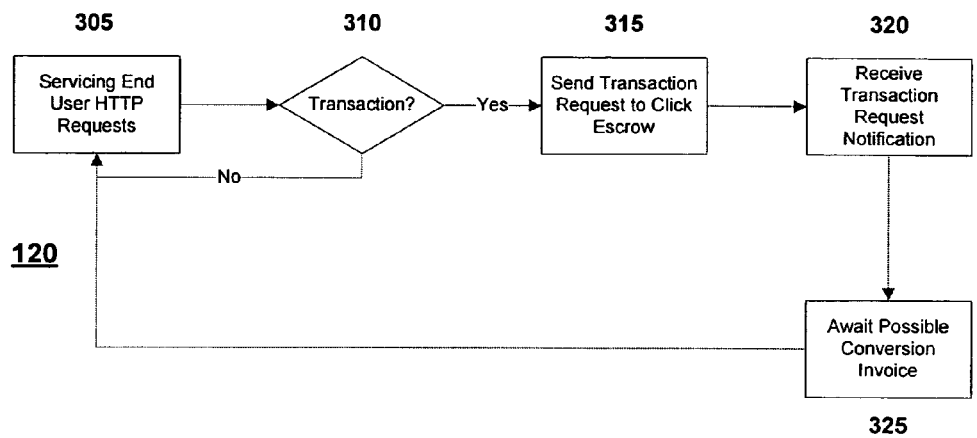
FIG. 2 is a flow chart depicting one embodiment of the invention wherein a merchant uses a click escrow to facilitate pay-per-conversion.

FIG. 2 is a flow chart depicting one embodiment of the invention wherein a merchant uses a click escrow to facilitate pay-per-conversion. As illustrated, a merchant 120 may service the requests of an end used using end user device 102, block 305. An end user device 102 may link to the merchant 120's web page, in the manner described above, and may make a number of http requests through its client browser. In some embodiments, the merchant 120 may service the http requests and transmit web pages which may include product information, order forms, and offers for subscription or registration. In alternate embodiments, communication protocols other than or in addition to http may be employed. Upon receiving the content provided by the merchant 120, which may include a web page that enables the end user using end user device 102 to enter into a transaction with the merchant 120, the end user may attempt to enter into a transaction with the merchant 120, block 310. Upon receiving an indication of the end user's intent to enter into a transaction, the merchant 120 may send a transaction request to click escrow 130, block 315. The transaction request provided to the click escrow 130 may, in some embodiments, include credit card information. The click escrow 130 may then process the transaction, which may include interacting with a remote credit card server. The processes of the click escrow 130 are described below in greater detail in reference to FIG. 3. In some embodiments, subsequent to processing the transaction, the click escrow 130 may provide the merchant 120 with a notification that the transaction has, or has not, been successfully processed, block 320. If the transaction has successfully processed, the merchant 120 may then await the arrival of a conversion invoice for any qualifying transactions, block 325. The click escrow 130 may provide such an invoice to merchant 120 in real time or in batches of invoices, if the click escrow 130 determines that the conversion has resulted from an end user click, as is described below.

In other embodiments of the invention, not shown, the click escrow 130 may verify the credit card transactions rather than process them. In such embodiments, the merchant 120 may process the transaction itself, and provide the verification to the click escrow 130, which may then provide and invoice to merchant 120, block 325, if the transaction resulted from an end user click on an advertisement displayed by search engine 110. In yet other embodiments, also not shown, the transaction may be accomplished by means other than credit card transactions, with the click escrow 130 either processing or verifying the transactions.

Figure 3:
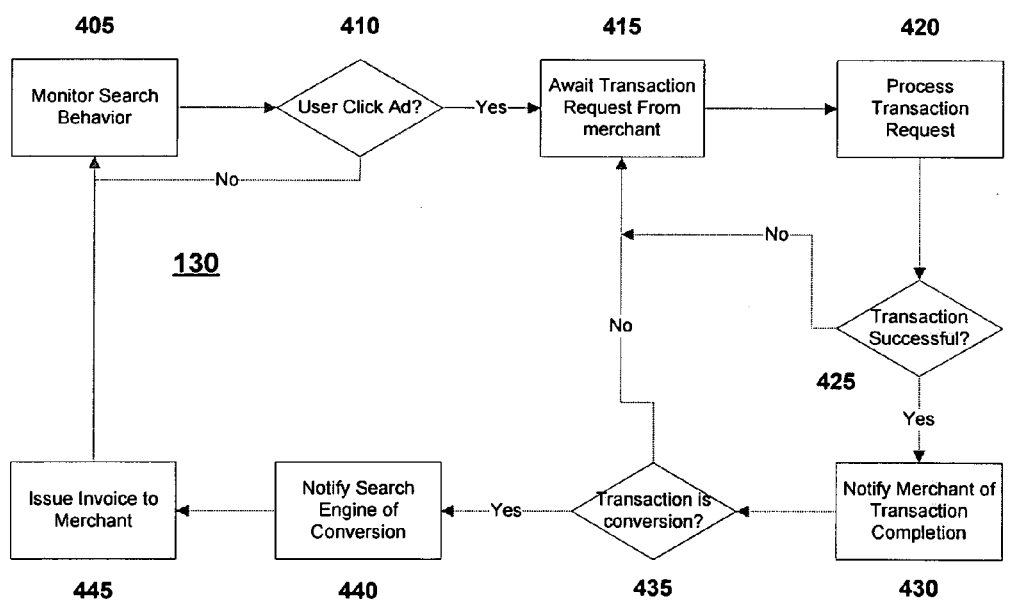
FIG. 3 is a flow chart depicting one embodiment of the invention wherein a click escrow facilitates pay-per-conversion.

FIG. 3 is a flow chart depicting one embodiment of the invention wherein a click escrow facilitates pay-per-conversion. As illustrated, the click escrow 130 may monitor the search behavior of an end user using end user device 102 on search engine 110, including detecting clicks by the end user on advertisements displayed among the search results, blocks 405-410. The advertisement clicked on by an end user may be an advertisement to merchant 120. Click escrow 130 not only detects such clicks, but stores them as well for future reference. Upon detecting the click, the click escrow 130 may await a transaction request from the merchant 120, block 415. Such transaction requests are described in greater detail above, and may include, for example, requests for credit transactions. After receiving a transaction request, the click escrow 130 may then process the transaction, block 420, and may then determine whether the transaction processed successfully, block 425. If the transaction request is for a credit card transaction, the click escrow 130 may communicate with a remote credit card server to complete the transaction, providing the credit card information and receiving return notification of whether a successful charge occurred. If the transaction was successful, block 425, click escrow 130 may notify the merchant 120 of the successful billing event, block 430. The notification may take the form of a function call, web content, an email, etc. In some embodiments, the click escrow 130 may then attempt to match an end user ad click, which, as mentioned above, may have been stored by click escrow 130, to the successful transaction to determine whether a conversion has occurred, block 435. Upon determining that a conversion has occurred, click escrow 130 may then notify the search engine 110 of the conversion, block 440, and issue a conversion invoice to the merchant 120 in real time or in batch, block 445. The notification/invoice may take the form of a function call, web content, an email, etc.

In other embodiments of the invention, not shown, click escrow 130 may verify the credit card transactions rather than process them. In such embodiments, the click escrow 130 may receive the verification from merchant 120 and determine if the verified transaction resulted from an advertisement click, in the manner described above. In various embodiments, the transaction may be accomplished by means other than credit card transactions, with the click escrow 130 either processing or verifying the transactions. In yet other embodiments, not shown, the click escrow 130 may act as a physical intermediary between the merchant 120 and the end user device 102. The search engine 110, upon receiving a click on an advertisement, may connect the end user device 102 to the click escrow 130 rather than to the merchant 120 which the ad links to. The click escrow 130 may then establish a connection between the end user 102 and merchant 120. The click escrow 130's role as a physical intermediary may or may not be hidden from the end user and/or end user device 102. Also, the search engine 110 may even delegate the display order of the ads to click escrow 130.

In other embodiments of the invention, click escrow 130 may use methods in addition to, or instead of, credit card transactions to identify fraud including, but not limited to, passwords, biometrics, and Turing tests.

In yet other embodiments, click escrow 130 may provide merchant 120 with a keyword service facilitating merchant 120 in selecting advertisements. Such services may include predicting the effectiveness of advertising keywords provided by the merchant 120, and generating advertising keywords for use by the merchant 120.

Figure 4:
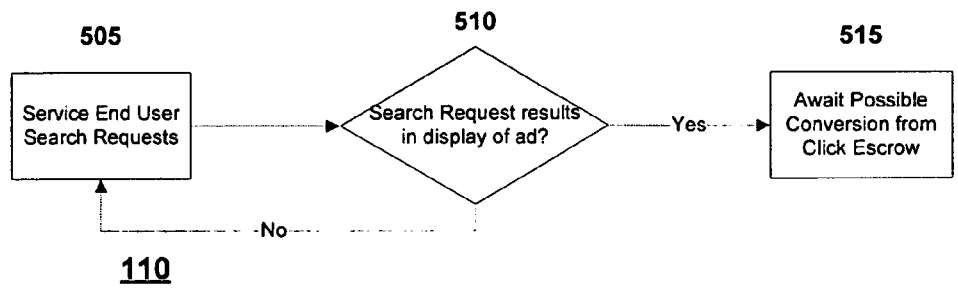
FIG. 4 is a flow chart depicting one embodiment of the invention wherein a search engine uses a click escrow to facilitate pay-per-conversion.

FIG. 4 is a flow chart depicting one embodiment of the invention wherein a search engine uses a click escrow to facilitate pay-per-conversion. As illustrated, the search engine 110 may service the search requests of an end user using end user device 102, block 505, including search requests based on one or more search terms or phrases. Search engine 110 may then perform a search based on the input provided by the user, and may determine a plurality of relevant search results, including advertisements such as those of the merchant 120. Upon determining the search results, including the advertisement(s), the search engine 110 may display the ad(s) and other results on a search page, block 510. For each ad it displays, search engine 110 may await a possible notification of a conversion event from the click escrow 130, block 515. As discussed above, such an event may occur if the end user clicks on the ad, gets taken to the merchant 120's website, and enters into a successful transaction with the merchant 120.

In some embodiments of the invention, not shown search engine 110 may further order the display of ads for a given keyword using factors including, but not limited to, the probability of end user click through on an ad, the probability of a conversion for merchant 120, the payoff the search engine 110 receives in the event of a conversion. In alternate embodiments, search engine 110 may delegate the display order of the ads to click escrow 130, as described above.

In various embodiments of the invention, a comprehensive optimization of a portfolio of advertisement search keywords may be provided, using factors including, but not limited to, click-through, conversion rates, and click fraud.

Figure 5:
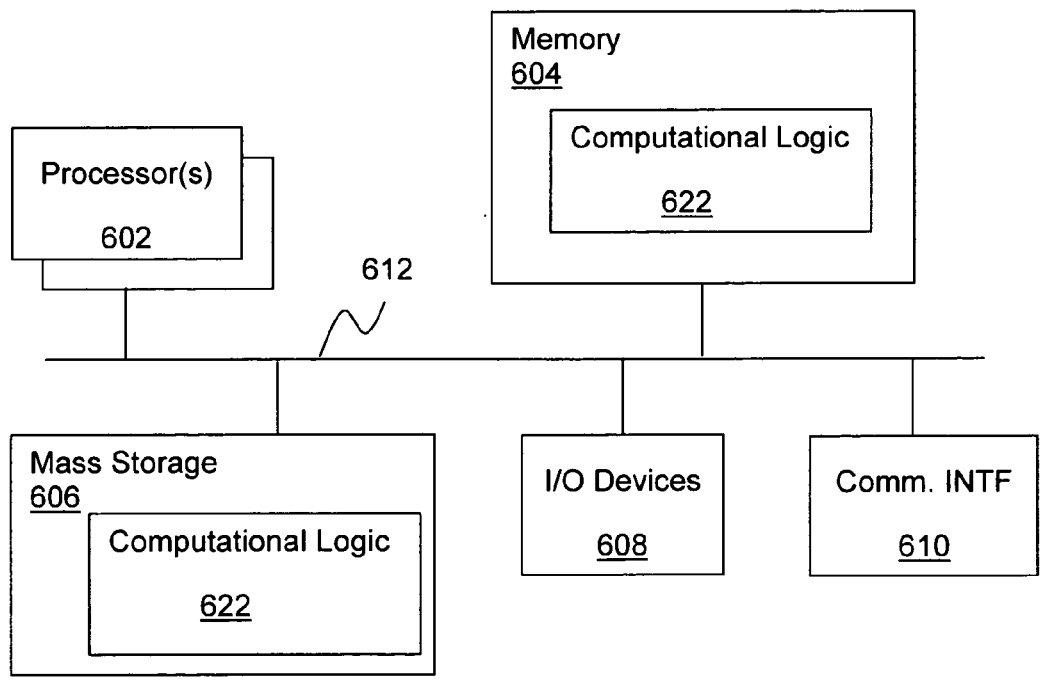
FIG. 5 illustrates an exemplary computing device capable of performing the operations of the end user device, search engine, merchant, and/or click escrow, in accordance with an embodiment of the present invention.

FIG. 5 illustrates an exemplary computing device capable of performing the operations of the end user device, search engine, merchant, and/or click escrow, in accordance with an embodiment of the present invention. As shown, computing system/device 600 may include one or more processors 602, and system memory 604. Additionally, computing system/device 600 may include mass storage devices 606 (such as diskette, hard drive, CDROM and so forth), input/output devices 608 (such as keyboard, cursor control and so forth) and communication interfaces 610 (such as network interface cards, modems and so forth). The elements may be coupled to each other via system bus 612, which represents one or more buses. In the case of multiple buses, they may be bridged by one or more bus bridges (not shown).

System memory 604 and mass storage 606 may be employed to store a working copy and a permanent copy of the programming instructions implementing one or more of the functions earlier described for end user device 102, search engine 110, merchant 120, and click escrow 130 per the above described teachings of the present invention. The programming instructions may be implemented in assembler instructions supported by processor(s) 602 or high level languages, such as C, that may be compiled into such instructions.

The permanent copy of the programming instructions may be placed into permanent storage 606 in the factory, or in the field, through e.g. a distribution medium (not shown) or through communication interface 610 (from a distribution server (not shown)).

Although specific embodiments have been illustrated and described herein for purposes of description of the preferred embodiment, it will be appreciated by those of ordinary skill in the art that a wide variety of alternate and/or equivalent implementations may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A method comprising:
    detecting, by an agent trusted by a merchant and a search engine, a click on an advertisement displayed by the search engine on a client device, the agent, the merchant and the search engine being all separate and distinct, and remotely disposed from each other and from the client device, the detecting including
        receiving a connection request by the trusted agent to connect a user to the merchant from the search engine, wherein the connection request resulted from the click on the advertisement associated with the merchant;
    determining, by the trusted agent, that a transaction of the merchant associated with the displayed advertisement was completed;
    determining, by the trusted agent, if the completed transaction was resulted from the click; and
    notifying, by the trusted agent, the merchant and the search engine of a billing event associated with the click, if the completed transaction was determined to be resulted from the click.

2. The method of claim 1, further comprising monitoring, by the trusted agent, search behavior of a user of the search engine, including said detecting the click, wherein the user clicked on the displayed advertisement.

3. The method of claim 1, comprising establishing by the trusted agent a connection to the merchant on behalf of the user.

4. The method of claim 1, wherein determining that a transaction was completed comprises
    receiving, by the trusted agent, a transaction request from the merchant to process a transaction between the merchant and a user,
    processing, by the trusted agent, the request to complete the transaction, and
    if the transaction was completed, notifying the merchant of the completion of the transaction.

5. The method of claim 4, wherein the transaction is a credit transaction and the request includes credit card information.

6. The method of claim 4, further comprising notifying, by the trusted agent, the merchant of the failure of the transaction request if the transaction was not completed.

7. The method of claim 1, wherein determining that a transaction was completed comprises receiving, by the trusted agent, verification of the transaction from the merchant.

8. The method of claim 1, wherein determining the transaction resulted from the click comprises matching, by the trusted agent, a user that generated the click to a user that completed the transaction with the merchant.

9. The method of claim 1, wherein determining the transaction resulted from the click comprises correlating, by the trusted agent, the click to the completed transaction, the correlating based at least in part on time between the click and the completed transaction, the time having a brief or a long duration.

10. The method of claim 1, wherein notifying the merchant of the billing event comprises issuing, by the trusted agent, a conversion invoice to the merchant.

11. The method of claim 1, further comprising:
    providing, by the trusted agent, the merchant with one or more keyword effectiveness metrics for one or more keywords submitted to the trusted agent by the merchant, and/or
    generating, by the trusted agent, one or more keywords for use by the merchant in determining an advertisement.

12. An apparatus comprising:
    a processor; and
    an agent, trusted by a merchant and a search engine, operated by the processor and adapted to
        detect a click on an advertisement displayed by the search engine on a client device, the apparatus, the merchant and the search engine being all separate and distinct and remotely disposed from each other and from the client device, determine that a transaction of the merchant associated with the displayed advertisement was completed, the determining including
  receiving a transaction request from the merchant to process a transaction between the merchant and a user,
  processing the request to complete the transaction, and
  if the transaction was completed, notifying the merchant of the completion of the transaction,
determine if the completed transaction was resulted from the click, and
notify the merchant and the search engine of a billing event associated with the click, if the completed transaction was determined to be resulted from the click.

13. The apparatus of claim 12, wherein the agent is further adapted to monitor search behavior of a user of the search engine, including said detecting the click, wherein the user clicked on the displayed advertisement.

14. The apparatus of claim 12, wherein the agent is adapted to detect the click, and said detecting comprises receiving a connection request to connect a user to the merchant from the search engine, wherein the connection request resulted from the click on the advertisement associated with the merchant.

15. The apparatus of claim 12, wherein the agent is adapted to determine the transaction resulted from the click, and said determining comprises matching a user that generated the click to a user that completed the transaction with the merchant.

16. The apparatus of claim 12, wherein the agent is adapted to notify the merchant of the billing event, and said notifying comprises issuing a conversion invoice to the merchant.

17. An article of manufacture comprising:
a storage medium; and
a plurality of programming instructions stored on the storage medium and configured to program an apparatus, trusted by a merchant and a search engine, to
  detect a click on an advertisement displayed by the search engine on a client device, the apparatus, the merchant, the search engine being separate and distinct, and being remotely disposed from each other and from the client device,
  determine that a transaction of the merchant associated with the displayed advertisement was complete,
  determine if the completed transaction was resulted from the click,
  notify the merchant and the search engine of a billing event associated with the click, if the completed transaction was determined to be resulted from the click, and
  provide the merchant with one or more keyword effectiveness metrics for one or more keywords submitted to the trusted agent by the merchant.

18. The article of claim 17, wherein the programming instructions are further configured to determine that a transaction was completed, and the determining comprises
  receiving a transaction request from the merchant to process a transaction between the merchant and a user,
  processing the request to complete the transaction, and
  if the transaction was completed, notifying the merchant of the completion of the transaction.

19. The article of claim 17, wherein the programming instructions are further configured to determine that a transaction was completed, and the determining comprises receiving verification of the transaction from the merchant.

20. The article of claim 17, wherein the programming instructions are further configured to notify the merchant of the billing event, and the notifying comprises issuing a conversion invoice to the merchant.

* * * * *